United States Patent [19]

Tsutsui et al.

[11] Patent Number: 5,234,878
[45] Date of Patent: Aug. 10, 1993

[54] OLEFIN POLYMERIZATION SOLID CATALYSTS AND PROCESS FOR THE POLYMERIZATION OF OLEFINS

[75] Inventors: Toshiyuki Tsutsui; Takashi Ueda, both of Kuga, Japan

[73] Assignee: Mitsui Petrochemical Industries, Ltd., Tokyo, Japan

[21] Appl. No.: 653,943

[22] Filed: Feb. 12, 1991

[30] Foreign Application Priority Data

Feb. 13, 1990 [JP] Japan .................................. 2-32091

[51] Int. Cl.⁵ .......................... C08F 4/656; C08F 4/68; C08F 4/69
[52] U.S. Cl. ................................. 502/103; 502/108; 502/111; 502/117; 502/118; 502/120; 502/103; 526/129
[58] Field of Search ............... 502/108, 111, 117, 118, 502/120

[56] References Cited

U.S. PATENT DOCUMENTS

| | | | |
|---|---|---|---|
| 4,871,705 | 10/1989 | Hoel | 502/108 X |
| 4,874,734 | 10/1989 | Kioka et al. | 502/108 X |
| 4,912,075 | 3/1990 | Chang | 502/120 X |
| 4,935,397 | 6/1990 | Chang | 502/120 X |
| 5,008,228 | 4/1991 | Chang | 502/120 X |

FOREIGN PATENT DOCUMENTS

| | | | |
|---|---|---|---|
| 0170059 | 5/1986 | European Pat. Off. | 502/117 |
| 61-276805 | 12/1986 | Japan . | |
| 2-53805 | 2/1990 | Japan . | |

*Primary Examiner*—Patrick P. Garvin
*Attorney, Agent, or Firm*—Sherman and Shalloway

[57] ABSTRACT

The present invention provides an olefin polymerization solid catalyst prepared by pre-polymerizing olefin in a suspension containing

[A] a component obtainable by bringing a particulate carrier, an organoaluminum compound [A-a] and water into contact with one another,

[B] a transition metal compound containing a ligand having a cycloalkadienyl skeleton and, if necessary,

[C] an organoaluminum compound.

1 Claim, 1 Drawing Sheet

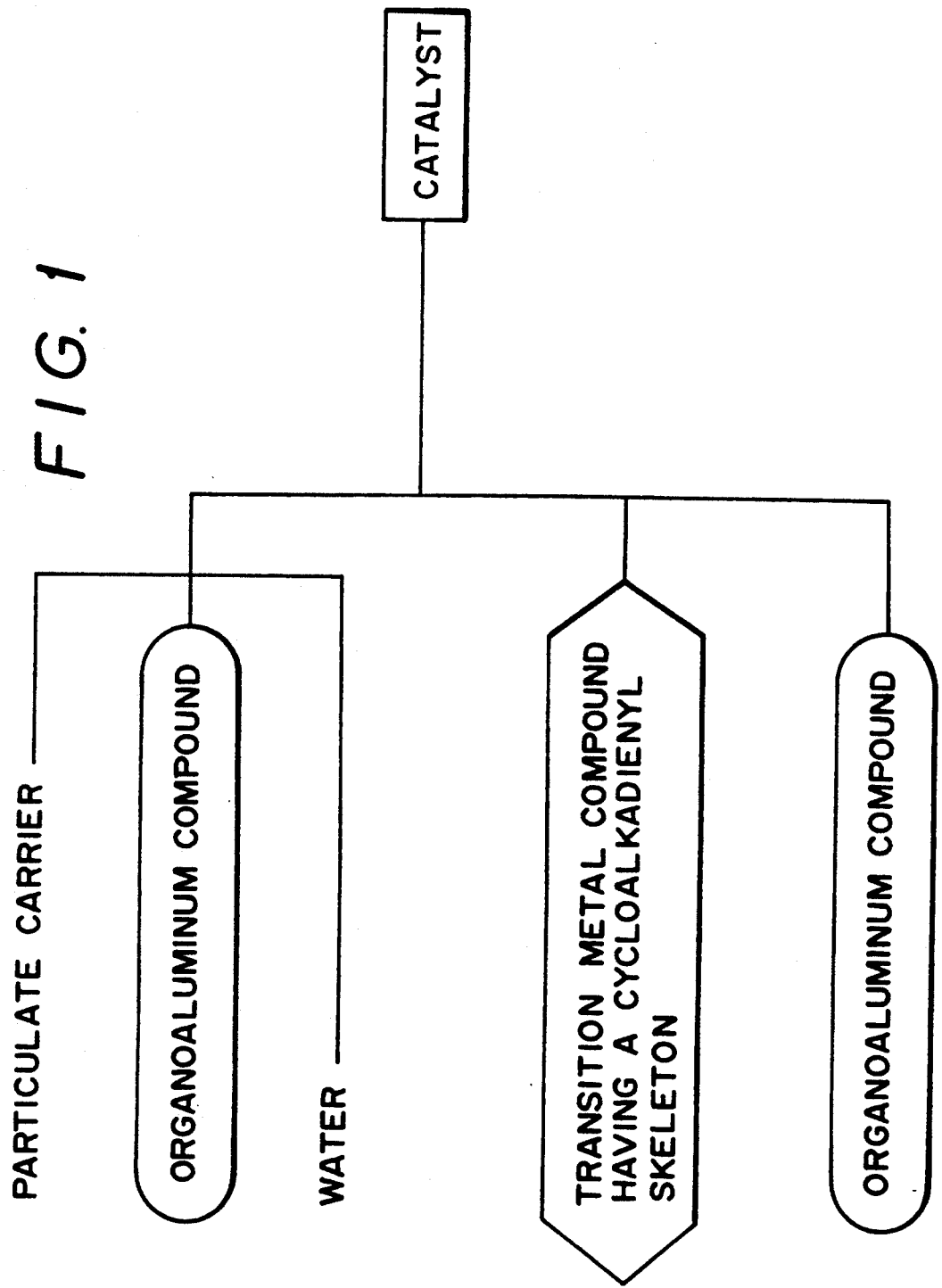

OLEFIN POLYMERIZATION SOLID CATALYSTS AND PROCESS FOR THE POLYMERIZATION OF OLEFINS

FIELD OF THE INVENTION

This invention relates to olefin polymerization solid catalysts and to processes for the polymerization of olefin. More particularly, the invention relates to olefin polymerization solid catalysts capable of preparing spherical olefin polymers excellent in bulking density and having a narrow molecular weight distribution when applied to slurry polymerization or vapor phase polymerization in particular, and also capable of giving olefin polymers having a narrow molecular weight distribution and a narrow composition distribution when applied to copolymerization of two or more kinds of olefins.

BACKGROUND OF THE INVENTION

It has heretofore been known that titanium based catalyst composed of a titanium compound and an organoaluminum compound, or vanadium based catalyst composed of a vanadium compound and an organoaluminum compound are used as catalyst for the preparation of α-olefin polymers, for example, ethylene polymers or ethylene/α-olefin copolymers.

On the one hand, there have been proposed recently processes for the preparation of ethylene/α-olefin copolymers using catalysts composed of zirconium compounds and aluminoxanes as a new type of Ziegler catalysts for olefin polymerization.

In comparison with known catalyst systems composed of transition metal compounds and organoaluminum compounds, the catalysts composed of such transition metal compounds and aluminoxanes as proposed in the prior art as mentioned above are markedly excellent in polymerization activity. However, most of the catalyst systems as proposed above are soluble in the reaction system where they are used, and often used in the solution polymerization system, with the result that the process for the polymerization of olefins to which they are applied is limited. In addition thereto, when high molecular weight polymers are intended to obtain, the viscosity of the solution in the polymerization where said catalyst systems are used becomes markedly, and the polymers resulting from the post-treatment of the solution polymerization system are found to be low in bulking density. In view of the foregoing, it was difficult to obtain polymers excellent in particle properties by the use of such proposed catalyst systems.

On the one hand, there have been made attempts to carry out polymerization of olefins in the suspension or vapor phase polymerization system using catalysts comprising a porous inorganic oxide carrier, such as silica, silica alumina or alumina, having supported thereon either one or both of the above-mentioned transition metal compound and aluminoxane.

For example, Japanese Patent L-O-P Publns. Nos. 35006/1985, 35007/1985 and 35008/1985 disclose that catalysts comprising a transition metal compound and aluminoxane supported on silica, silica alumina or alumina may be used in the above-mentioned attempts.

Japanese Patent L-O-P Publn. No. 276805/1986 proposes a process for the polymerization of olefins carried out in the presence of a catalyst comprising a zirconium compound and a reaction mixture obtained by reacting a reaction mixture of an aluminoxane and trialkylaluminum with an inorganic oxide containing a surface hydroxyl group such as silica.

Japanese Patent L-O-P Publns. Nos. 108610/1986 and 296008/1986 propose a process for the polymerization of olefins carried out in the presence of a catalyst comprising a transition metal such as metallocene and an aluminoxane supported on a support such as an inorganic oxide.

In the processes proposed in the prior art literatures as mentioned above, however, the aluminoxane component used in the catalyst had to be synthesized separately.

Japanese Patent L-O-P Publn. No. 31404/1986 proposes a process for the polymerization or copolymerization of ethylene or ethylene and α-olefin carried out in the presence of a mixed catalyst comprising a product obtained by reaction of trialkylaluminum with water in the presence of silicon dioxide oz aluminum oxide and a transition metal. According to this process, a separate step to synthesize aluminoxane can be omitted. In this process, however, the bulking density of the polymer obtained was as low as 0.2 g/cm$^3$.

Furthermore, Japanese Patent L-O-P Publn. No. 207303/1989 teaches a process for obtaining a vapor phase polymerization catalyst by adding a metallocene to a reaction mixture obtained by reaction of green silica gel with trialkylaluminum in a solvent, followed by removing the solvent from the resulting mixture and then by drying. This process, however, requires additionally many steps necessary for the synthesis of catalyst such as solvent removing step, drying step, etc., though a separate step for the synthesis of aluminoxane can be omitted.

OBJECT OF THE INVENTION

The present invention has been made in light of the prior art as mentioned above, and an object of the invention is to provide olefin polymerization solid catalysts capable of giving olefin polymers excellent in particle properties by a simple catalyst synthesis step with no necessity for a separate step for the synthesis of aluminoxane, and a process for the polymerization of olefins using said catalysts.

SUMMARY OF THE INVENTION

The olefin polymerization solid catalyst of the present invention is prepared by pre polymerizing olefin in a suspension containing

[A] a component obtainable by bringing a particulate carrier, an organoaluminum compound [A-a] and water into contact with one another,

[B] a transition metal compound containing a ligand having a cycloalkadienyl skeleton and, if necessary,

[C] an organoaluminum compound.

The process for the polymerization of olefins of the invention comprises polymerizing or copolymerizing olefins in the presence of the above-mentioned olefin polymerization solid catalyst.

The olefin polymerization solid catalyst of the invention as illustrated above is capable of giving olefin polymers excellent in particle properties and having a narrow molecular weight distribution when applied to polymerization of olefins, and is also capable of giving olefin copolymers, particularly ethylene copolymers, having a narrow molecular weight distribution and a narrow composition distribution when applied to copolymerization of two or more kinds of olefins.

BRIEF DESCRIPTION OF THE DRAWING

FIG. 1 is a rough schematic drawing showing synthesis of the olefin polymerization solid catalyst of the present invention.

DETAILED DESCRIPTION OF THE INVENTION

Hereinafter, the olefin polymerization catalyst of the present invention and the process for the polymerization of olefins using said catalyst are illustrated in detail.

In the invention, the term "polymerization" is sometimes used in a sense that it includes not only homopolymerization but also copolymerization, and also the term "polymer" is sometimes used in a sense that it includes not only a homopolymer but also a copolymer.

The olefin polymerization solid catalyst of the invention is prepared by pre-polymerizing olefin in a suspension containing

[A] a component obtainable(obtained) by bringing a particulate carrier, an organoaluminum compound [A-a] and water into contact with one another, and

[B] a transition metal compound containing a ligand having a cycloalkadienyl skeleton.

The particulate carrier used in the invention includes particulate inorganic or organic carriers having an average particle diameter of usually 1-300 μm, preferably 10-200 μm. The particulate inorganic carrier used includes preferably oxides, for example, $SiO_2$, $Al_2O_3$, MgO, $ZrO_2$, $TiO_2$ or mixtures thereof. Of the particulate inorganic carriers as exemplified above, preferred are those consisting essentially of at least one component selected from the group consisting of $SiO_2$, $Al_2O_3$ and MgO.

The particulate organic carrier used includes particulate organic polymers, for example, particulate polymers of olefins, such as polyethylene, polypropylene, poly-1-butene and poly-4-methyl-1-pentene, and particulate polymers such as polystyrene.

The organoaluminum compounds [A-a] used in the present invention include, for example, trialkylaluminum such as trimethylaluminum, triethylaluminum, tripropylaluminum, triisopropylaluminum, tri-n-butylaluminum, triisobutylaluminum, tri-sec-butylaluminum, tri-tertbutylaluminum, tripentylaluminum, trihexylaluminum, trioctylaluminum, tridecylaluminum, tricyclohexylaluminum, tricyclooctylaluminum; dialkylaluminum halides such as dimethylaluminum chloride, diethylaluminum chloride, diethylaluminum bromide and diisobutylaluminum chloride; dialkylaluminum hydrides such as diethylaluminum hydride and diisobutylaluminum hydride; dialkylaluminum alkoxides such as dimethylaluminum methoxide and diethylaluminum ethoxide; and dialkylaluminum aryloxides such as diethylaluminum phenoxide.

Of the organoaluminum compounds as exemplified above, particularly preferred is trialkylaluminum.

Furthermore, there may also be used as the organoaluminum compound isoprenylaluminum represented by the general formula

$$(i-C_4H_9)_x Al_y (C_5H_{10})_z$$

wherein x, y and z are each a positive number, and $z \geq 2x$.

The organoaluminum compounds mentioned above may be used either singly or in combination.

The transition metal compound [B] containing a ligand having a cycloalkadienyl skeleton used in the present invention is represented by the formula $ML_x$ wherein M is a transition metal, L is a ligand coordinating to the transition metal, at least one of L is a ligand having a cycloalkadienyl skeleton, and when at least two or more ligands having a cycloalkadienyl skeleton are contained, at least two ligands having a cycloalkadienyl skeleton may be linked together via alkylene, substituted alkylene, silylene or substituted silylene, L other than the ligand having a cycloalkadienyl skeleton is hydrocarbon group of 1-12 carbon atoms, alkoxy of 1-12 carbon atoms, aryloxy, silyloxy, halogen or hydrogen, and x is a valence of the transition metal.

In the above-mentioned formula, M which is a transition metal includes zirconium, titanium, hafnium, chromium or vanadium by preference, and particularly preferred are zirconium and hafnium.

The ligands having a cycloalkadienyl skeleton include, for example, cyclopentadienyl, alkyl-substituted cyclopentadienyl such as methylcyclopentadienyl, ethylcyclopentadienyl, n-butylcyclopentadienyl, dimethylcyclopentadienyl and pentamethylcyclopentadienyl, and indenyl and fluorenyl.

Two or more ligands having a cycloalkadienyl skeleton as mentioned above may coordinate to the transition metal and, in this case, at least two ligands having a cycloalkadienyl skeleton may be linked together via alkylene, substituted alkylene, silylene or substituted silylene. The alkylene group includes methylene, ethylene and propylene, the substituted alkylene includes isopropylidene, etc., and the substituted silylene includes dimethylsilylene and diphenylsilylene.

The ligand other than those having a cycloalkadienyl skeleton is a hydrocarbon group of 1-12 carbon atoms, an alkoxy group, an aryloxy group, halogen or hydrogen.

The hydrocarbon group having 1-12 carbon atoms mentioned above includes, for example, alkyl, cycloalkyl, aryl and aralkyl, and the alkyl group includes methyl, ethyl, propyl, isopropyl and butyl.

The cycloalkyl group mentioned above includes, for example, cyclopentyl and cyclohexyl, the aryl group includes, for example, phenyl and tolyl, and the aralkyl group includes, for example, benzyl and neophyl.

The alkoxy group mentioned above includes, for example, methoxy, ethoxy and butoxy, and the aryloxy group includes, for example, phenoxy.

The silyloxy group mentioned above includes, for example, trimethylsilyloxy and triphenylsilyloxy.

The halogen mentioned above includes, for example, fluorine, chlorine, bromine and iodine.

Listed below are typical representatives of the transition metal compounds having a cycloalkadienyl skeleton, represented by the aforementioned formula $ML_x$ in which M is zirconium.

Bis(cyclopentadienyl)zirconium monochloride monohydride,
Bis(cyclopentadienyl)zirconium monobromide monohydride,
Bis(cyclopentadienyl)methyl zirconium hydride,
Bis(cyclopentadienyl)ethyl zirconium hydride,
Bis(cyclopentadienyl)phenyl zirconium hydride,
Bis(cyclopentadienyl)benzyl zirconium hydride,
Bis(cyclopentadienyl)neopentyl zirconium hydride,
Bis(methylcyclopentadienyl)zirconium monochloride hydride,
Bis(indenyl)zirconium monochloride monohydride, Bis(cyclopentadienyl)zirconium dichloride,
Bis(cyclopentadienyl)zirconium dibromide,
Bis(cyclopentadienyl)methyl zirconium monochloride,
Bis(cyclopentadienyl)ethyl zirconium monochloride,
Bis(cyclopentadienyl)cyclohexyl zirconium monochloride,
Bis(cyclopentadienyl)phenyl zirconium monochloride,
Bis(cyclopentadienyl)benzyl zirconium monochloride,
Bis(methylcyclopentadienyl)zirconium dichloride,
Bis(dimethylcyclopentadienyl)zirconium dichloride,
Bis(n-butylcyclopentadienyl)zirconium dichloride,
Bis(indenyl)zirconium dichloride,
Bis(indenyl)zirconium dibromide,
Bis(cyclopentadienyl)zirconium dimethyl,
Bis(cyclopentadienyl)zirconium diphenyl,
Bis(cyclopentadienyl)zirconium dibenzyl,
Bis(cyclopentadienyl)zirconium methoxychloride,
Bis(cyclopentadienyl)zirconium ethoxychloride,
Bis(methylcyclopentadienyl)zirconium ethoxychloride,
Bis(cyclopentadienyl)zirconium phenoxychloride,
Bis(fluorenyl)zirconium dichloride,
Bis(cyclopentadienyl)zirconium triphenylsilyloxychloride,
Ethylenebis(indenyl)dimethyl zirconium,
Ethylenebis(indenyl)diethyl zirconium,
Ethylenebis(indenyl)phenyl zirconium monochloride,
Ethylenebis(indenyl)methyl zirconium monochloride,
Ethylenebis(indenyl)ethyl zirconium monochloride,
Ethylenebis(indenyl)methyl zirconium monobromide,
Ethylenebis(indenyl)zirconium dichloride,
Ethylenebis(indenyl)zirconium dibromide,
Ethylenebis(4,5,6,7-tetrahydro-1-indenyl)dimethyl zirconium,
Ethylenebis(4,5,6,7-tetrahydro-1-indenyl)methyl zirconium monochloride,
Ethylenebis(4,5,6,7-tetrahydro-1 indenyl)zirconium dichloride,
Ethylenebis(4,5,6,7-tetrahydro-1-indenyl)zirconium dibromide,
Ethylenebis(4-methyl-1-indenyl)zirconium dichloride,
Ethylenebis(5-methyl-1-indenyl)zirconium dichloride,
Ethylenebis(6-methyl-1-indenyl)zirconium dichloride,
Ethylenebis(7-methyl-1-indenyl)zirconium dichloride,
Ethylenebis(5-methoxy-1-indenyl)zirconium dichloride,
Ethylenebis(2,3-dimethyl-1-indenyl)zirconium dichloride,
Ethylenebis(4,7-dimethyl-1-indenyl)zirconium dichloride,
Ethylenebis(4,7-dimethoxy-1-indenyl)zirconium dichloride,
Dimethylsilylenenbis(cyclopentadienyl)zirconium dichloride,
Dimethylsilylenebis(indenyl)zirconium dichloride,
Dimethylsilylenebis(methylcyclopentadienyl)zirconium dichloride,
Isopropylidenebis(indenyl)zirconium dichloride,
Isopropylidene(cyclopentadienyl-fluorenyl)zirconium dichloride.

There may also be used transition metal compounds obtained by replacing the zirconium metal in the above-exemplified zirconium compounds with titanium metal, hafnium metal, or vanadium metal.

The second olefin polymerization solid catalyst of the present invention is illustrated below.

This olefin polymerization solid catalyst is prepared by pre-polymerizing olefin in a suspension containing

[A] a component obtained by bringing a particulate carrier, an organoaluminum compound [A-a] and water into contact with one another,
[B] a transition metal compound containing a ligand having a cycloalkadienyl skeleton, and
[C] an organoaluminum compound.

The organoaluminum compounds [C] used in the present invention may be represented, for example, by the formula $R^6_n AlX_{3-n}$ wherein $R^6$ is hydrocarbon of 1-12 carbon atoms, X is halogen and n is 1-3.

In the above-mentioned formula, $R^6$ is hydrocarbon of 1-12 carbon atoms, for example, alkyl, cycloalkyl or aryl, including concretely methyl, ethyl, n-propyl, isopropyl, isobutyl, pentyl, hexyl, octyl, decyl, cyclopentyl, cyclohexyl, phenyl, tolyl, etc.

The above mentioned organoaluminum compounds will be exemplified below.

Trialkylaluminum such as trimethylaluminum, triethylaluminum, triisopropylaluminum, triisobutylaluminum, trihexylaluminum, trioctylaluminum, tri-2-ethylhexylaluminum, etc.

Alkenylaluminum such as isoprenylaluminum, etc.

Dialkylaluminum halides such as dimethylaluminum chloride, diethylaluminum chloride, diisopropylaluminum chloride, diisobutylaluminum chloride, dimethylaluminum bromide, etc.

Alkylaluminum sesquihalides such as methylaluminum sesquichloride, ethylaluminum sesquichloride, isopropylaluminum sesquichloride, butylaluminum sesquichloride, ethylaluminum sesquibromide, etc.

Alkylaluminum dihalides such as methylaluminum dichloride, ethylaluminum dichloride, isopropylaluminum dichloride, ethylaluminum dibromide, etc.

Alkylaluminum hydrides such as diethylaluminum hydride, diisobutylaluminum hydride, etc.

Furthermore, there may also be used other organoaluminum compounds represented by the formula $R^6_n AlY_{3-n}$ wherein $R^6$ is as defined previously, Y is $-OR^7$, $-OSiR^8_3$, $-OAlR^9_2$, $-NR^{10}_2$, $-SiR^{11}_3$ or

n is 1-2, $R^7$, $R^8$, $R^9$ and $R^{13}$ are each methyl, ethyl, isopropyl, isobutyl, cyclohexyl or phenyl, $R^{10}$ is hydrogen, methyl, ethyl, isopropyl, phenyl or trimethylsilyl, $R^{11}$ and $R^{12}$ are each methyl or ethyl.

The organoaluminum compounds as mentioned above include, in concrete, such compounds as enumerated below.

(i) Compounds of the formula $R^6_n Al(OR^7)_{3-n}$ such as dimethylaluminum methoxide, diethylaluminum ethoxide, diisobutylaluminum methoxide, etc.
(ii) Compounds of the formula $R^6_n Al(OSiR^8_3)_{3-n}$ such as $Et_2Al(OSiMe_3)$, $(iso-Bu)_2Al(OSiMe_3)$, $(iso-Bu)_2Al(OSiEt_3)$, etc.
(iii) Compounds of the formula $R^6_n Al(OAlR^9_2)_{3-n}$ such as $Et_2AlOAlEt_2$, $(iso-Bu)_2AlOAl(iso-Bu)_2$, etc.
(iv) Compounds of the formula $R^6_n Al(NR^{10}_2)_{3-n}$ such as $Me_2AlNEt_2$, $Et_2AlNHMe$, $Me_2AlNHEt$, $Et_2AlN(Me_3Si)_2$, $(iso-Bu)_2AlN(Me_3Si)_2$, etc.
(v) Compounds of the formula $R^6_n Al(SiR^{11}_3)_{3-n}$ such as $(iso-Bu)_2AlSiMe_3$, etc.

(vi) Compounds of the formula $R^6{}_nAl(NAlR^{13}{}_2)_{3-n}$ such as

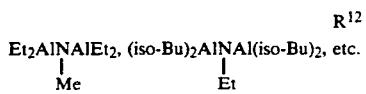
$Et_2AlNAlEt_2$, $(iso\text{-}Bu)_2AlNAl(iso\text{-}Bu)_2$, etc.

Of the organoaluminum compounds as exemplified above, preferred are those of the formula $R^6{}_3Al$, $R^6{}_nAl(OR^7)_{3-n}$ and $R^6Al(OAlR^9{}_2)_{3-n}$, particularly those in which $R^6$ is isoalkyl and $n=2$ are desirable. These organoaluminum compounds may be used in combination of two or more.

The olefin polymerization solid catalysts according to the present invention may be prepared in the manner as will be mentioned hereinafter.

First, the component [A] is prepared by bringing a particulate carrier, an organoaluminum compound [A-a] and water in contact with one another by mixing them together in an inert hydrocarbon medium.

In this case, based on 1 g of the particulate carrier, the organoaluminum compound [A-a] is used in an amount of usually $10^{-3}$–$2\times10^{-1}$ mole, preferably $2\times10^{-3}$–$10^{-1}$ mole, and the water is used in an amount of usually $5\times10^{-4}$–$10^{-1}$ mole, preferably $10^{-3}$–$5\times10^{-2}$ mole. The proportion of the water to the organoaluminum compound A-a] in terms of molar ratio ($H_2O/Al$) is 0.3–2, preferably 0.5–1.5. The concentration of the organoaluminum compound [A-a] used is desirably about 0.1–5 mol/l preferably 0.3–3 mol/l. The reaction temperature employed is usually from $-100°$ to $120°$ C., preferably from $-70°$ to $100°$ C., and the reaction time is usually 1–200 hours, preferably 2–100 hours or thereabouts, though it varies according to the reaction temperature employed.

The water used may be present in any form, such as water adsorbed on the particulate carrier, water dissolved or dispersed in the inert hydrocarbon medium, water vapor or ice.

After completion of the reaction, the whole of the suspension as remained may be used as the component [A], a solids portion remained after removal of the inert hydrocarbon medium by filtration may be used as the component [A], or a solids portion obtained by evaporating the inert hydrocarbon medium from the suspension may be used as the component [A].

Next, the component [A] thus obtained is mixed with the transition metal compound [B] in an inert hydrocarbon, an olefin is introduced into the resulting mixture, and pre-polymerization of the olefin is carried out thereby to obtain the olefin polymerization solid catalyst of the present invention.

In mixing the component [A] with the component [B], the transition metal compound [B] is used in an amount, based on 1 g of the particulate carrier, of usually $10^{-5}$–$5\times10^{-3}$ mole, preferably $5\times10^{-5}$–$1\times10^{-3}$ mole, and the concentration of the transition metal compound [B] used is about $2\times10^{-4}$–$5\times10^{-2}$ mol/l preferably $5\times10^{-4}$–$2\times10^{-2}$ mol/l. The atomic ratio of aluminum to transition metal (Al/transition metal) in the component [A] is usually 10–500, preferably 20–200. The temperature at which the component [A] is mixed with the component [B] is usually from $-20°$ to $80°$ C., preferably $0°$ to $60°$ C., and the contact time is 1–200 minutes, preferably 5–120 minutes.

The amount of the organoaluminum compound [C] which is used optionally is usually 2–80 moles, preferably 4–40 moles based on 1 mole of the transition metal compound [B].

The pre-polymerization of olefin is carried out in the presence of the above-mentioned components [A] and [B] and, if necessary, the component [C]. In practicing the pre-polymerization, the transition metal compound is used in an amount of usually $10^{-4}$–$5\times10^{-2}$ mol/l, preferably $5\times10^{-4}$–$10^{-2}$ mol/l. The pre-polymerization temperature employed is from $-20°$ to $80°$ C., preferably from $0°$ to $50°$ C., and the pre-polymerization time is 0.5–100 hours, preferably 1–50 hours or thereabouts.

The olefin used in the pre-polymerization is selected from those commonly used in the polymerization of olefins, and preferred is ethylene.

On the olefin polymerization solid catalyst of the present invention thus obtained, are carried, per 1 g of the particulate carrier, about $5\times10^{-6}$–$10^{-3}$ gram atom, preferably $10^{-5}$–$5\times10^{-4}$ gram atom of the transition metal atom, and about $10^{-3}$–$10^{-1}$ gram atom, preferably $2\times10^{-3}$–$5\times10^{-2}$ gram atom of aluminum atom.

It is desirable that the amount, based on 1 g of the particulate carrier, of the polymer resulting from the pre-polymerization of olefin is about 0.1–500 g, preferably 0.3–300 g and especially 1–100 g.

The inert hydrocarbon medium used in the preparation of the olefin polymerization solid catalysts of the present invention include concretely aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane; or mixtures thereof.

In carrying out polymerization of olefins by using such olefin polymerization catalysts containing the pre-polymerized olefin as mentioned above, it is desirable to use the transition metal compound [B] in an amount, based on 1 liter of the polymerization volume, of usually $10^{-8}$–$10^{-3}$ gram atom, preferably $10^{-7}$–$10^{-4}$ gram atom in terms of transition metal atom. In this case, an organoaluminum compound or aluminoxane may also be used, if necessary. The organoaluminum compound used in that case includes the same compounds as the organoaluminum compound [C] as mentioned previously.

Olefins which can be polymerized with the olefin polymerization solid catalysts as mentioned above include ethylene and α-olefins of 3–20 carbon atoms, for example, propylene, 1-butene, 1-hexene, 4-methyl-1-pentene, 1-octene, 1-decene, 1-dodecene, 1-tetradecene, 1-hexadecene, 1-octadecene, 1-eicosene, cyclopentene, cycloheptene, norbornene, 5-methyl-2-morbornene, tetracyclododecene, 2-methyl-1,4,5,8-dimethano-1,2,3,4,4a,5,8,8a-octahydronaphthalene, etc.

In the present invention, the polymerization of olefins may be carried out by any of polymerization techniques, for example, liquid phase polymerization such as suspension polymerization, or vapor phase polymerization.

When the polymerization of olefins is carried out by the liquid phase polymerization technique, the same inert hydrocarbon solvent as used in the preparation of the catalyst may be used, and even the olefins themselves may be used as a solvent.

The polymerization temperature employed in the above case is usually from $-50°$ to $200°$ C., preferably from 0° to 150° C. The polymerization pressure employed is usually from ordinary pressure to 100 kg/cm², preferably from ordinary pressure to 50 kg/cm², and the polymerization reaction may be carried out by any of the batchwise, semi continuous and continuous methods. It is also possible to carry out the polymerization in two or more stages under different reaction conditions. The molecular weight of the resulting olefin polymer can be modified by allowing hydrogen to exist in the polymerization or varying the polymerization temperature employed.

In the present invention, the olefin polymerization solid catalysts may contain other useful components in addition to the above-mentioned components.

EFFECT OF THE INVENTION

The olefin polymerization solid catalysts of the present invention are capable of giving olefin polymers excellent in particle properties and having a narrow molecular weight distribution, and also capable of giving olefin copolymers having a narrow molecular weight distribution and a narrow composition distribution when applied to copolymerization of two or more kinds of olefins.

The present invention is illustrated below with reference to examples, but it should be construed that the invention is in no way limited to those examples.

EXAMPLE 1

Preparation of Solid Catalyst (Zirconium Catalyst)

A 400 ml glass flask thoroughly purged with nitrogen was charged with 3.1 g of silica (average particle diameter 70 μm, specific surface area 260 m²/g, pore volume 1.65 cm³/g) and 25 ml of toluene containing 0.45 ml of water.

Thereafter, the flask was cooled to −50° C., and charged dropwise with 25 ml of a solution of trimethylaluminum in toluene (Al=1 mol/l) over a period of 30 minutes.

Successively, the flask was stirred at −20° C. for 5 hours, at 0° C. for 1 hour, at 25° C. for 1 hour and then at 80° C. for 2 hours. Thereafter, the flask was cooled to room temperature, and charged with 7.6 ml of a solution of triisobutylaluminum in decane (Al=1.0 mol/l), followed by stirring for 30 minutes. The flask was then charged with 10.9 ml of a solution of bis(methylcyclopentadienyl) zirconium dichloride in toluene (Zr=4.6×10$^{-2}$ mol/l), followed by stirring for 30 minutes. The flask was then charged with 100 ml of decane, and ethylene gas (ordinary pressure) was introduced continuously into the system to carry out pre-polymerization of ethylene at 30° C. for 5 hours.

Thereafter, the solvent was removed by decantation from the system, followed by hot washing (60° C.) four times with 100 ml of hexane and then washing (room temperature) four times with 100 ml of hexane. This operation gave a solid catalyst containing 1.1×10$^{-4}$ gram atom of zirconium, 7.5×10$^{-3}$ gram atom of aluminum per 1 g of silica, and 5.0 g of polyethylene.

Polymerization

A 2-liter stainless steel autoclave thoroughly purged with nitrogen was charged with 150 g of sodium chloride (a special grade product of Wako Junyaku K.K.), followed by vacuum drying at 90° C. for 1 hour. Thereafter, the flask was cooled to 65° C., and was charged with 2.25 mmoles of triisobutylaluminum and 0.02 mg atom in terms of zirconium atom of the above-mentioned solid catalyst. Thereafter, 200 ml of hydrogen and then ethylene were introduced at 65° C. into the flask to initiate polymerization at the total pressure of 8 kg/cm²-G.

Thereafter, the polymerization was carried out at 80° C. for 2 hours while feeding only ethylene to the flask and maintaining the total pressure at 8 kg/cm²-G. After completion of the polymerization, the sodium chloride was removed from the reaction mixture by water washing, and the polymer remained was washed with hexane, followed by vacuum drying at 80° C. overnight. As the result, there was obtained 78 g of polyethylene having a bulking density of 0.38 g/cm³, MFR of 0.15 g/10 min and $\overline{M}w/\overline{M}n$ of 3.2.

EXAMPLE 2

Preparation of Solid Catalyst (Zirconium Catalyst)

The preparation of solid catalyst (zirconium catalyst) of Example 1 was repeated except that in place of the bis(methylcyclopentadienyl)zirconium dichloride, there was used 5.2 ml of a solution of bis(methylcyclopentadienyl) zirconium methoxy monochloride in toluene (Zr=9.69×10$^{-2}$ mol/l), whereby a solid catalyst containing 9.1×10$^{-5}$ gram atom of zirconium, 4.9×10$^{-3}$ gram atom of aluminum per 1 g of silica, and 3.8 g of polyethylene was obtained.

Polymerization

The polymerization of Example 1 was repeated except that a mixture obtained by mixing 0.02 mg atom in terms of zirconium atom of the solid catalyst as obtained above with 0.75 mmole of triisobutylaluminum at room temperature for 30 minutes in 5 ml of hexane was charged into the autoclave to carry out polymerization for 3 hours, whereby 77 g of polyethylene having a bulking density of 0.37 g/cm³, MFR of 0.20 g/10 min and $\overline{M}w/\overline{M}n$ of 3.3 was obtained.

EXAMPLE 3

Preparation of Solid Catalyst (Zirconium Catalyst)

A 400 ml glass flask thoroughly purged with nitrogen was charged 2.5 g of the same silica as used in Example 1 and 20 ml of toluene containing 0.33 ml of water. The flask was then cooled to −40° C., and charged dropwise with 20.5 ml of a solution of trimethylaluminum in toluene (Al=1 mol/l) over a period of 25 minutes. Successively, the reaction was carried out at −20° C. for 5 hours, at 0° C. for 1 hour, at 25° C. for 1 hour and then at 80° C. for 2 hours. Thereafter, the flask was cooled to room temperature, and charged with 6.2 ml of a solution of triisobutylaluminum in decane (Al=1 mol/l), followed by stirring for 30 minutes. The flask was then charged with 155 ml of a solution of ethylenebis(indenyl)zirconium dichloride in toluene (Zr=2.64×10$^{-3}$ mol/l), followed by stirring for 30 minutes. The flask was then charged with 100 ml of decane, and ethylene gas (ordinary pressure) was introduced continuously into the system to carry out pre-polymerization of ethylene at 35° C. for 4 hours. Thereafter, the same operation as in Example 1 was conducted, whereby a solid catalyst containing 9.2×10$^{-5}$ gram atom of zirconium, 7.2×10$^{-3}$ gram atom aluminum per 1 g of silica, and 4.3 g of polyethylene was obtained.

Polymerization

The polymerization of Example 1 was repeated except that no triisobutylaluminum was used, but the solid catalyst component as prepared above was used in an amount of 0.01 mg atom in terms of zirconium atom, the amount of hydrogen used was changed to 50 ml, and the polymerization was carried out for 1 hour, whereby 90 g of polyethylene having a bulking density of 0.35 g/cm$^3$, MFR of 0.95 g/10 min and $\overline{M}w/\overline{M}n$ of 2.9 was obtained.

What is claimed is:

1. An olefin polymerization solid catalyst prepared by pre-polymerizing olefin in a suspension containing
   [A] a component obtained by bringing a particulate carrier, an organoaluminum compound [A-a] and water into contact with one another,
   [B] a transition metal compound containing a ligand having a cycloalkadienyl skeleton, and
   [C] an organoaluminum compound.

* * * * *